Sept. 20, 1932.     W. J. LESTER     1,878,939
PRODUCTION OF METALLIC ALUMINUM AND OTHER MATERIALS
Filed Dec. 13, 1928
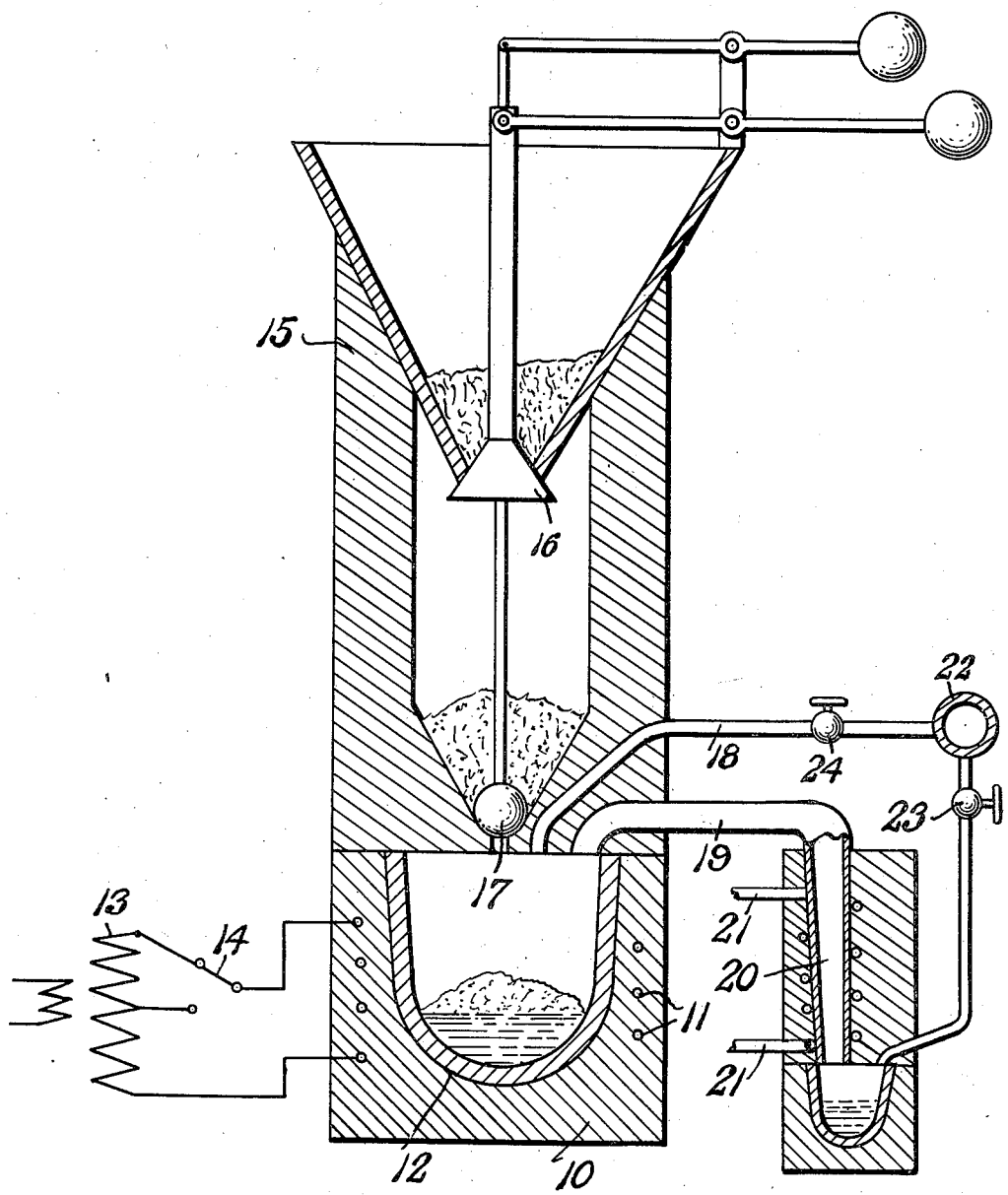
Inventor:
William J. Lester,
By Sturtevant & Mason,
Attorneys.

Patented Sept. 20, 1932

1,878,939

UNITED STATES PATENT OFFICE

WILLIAM JUNIUS LESTER, OF LITTLE ROCK, ARKANSAS

PRODUCTION OF METALLIC ALUMINUM AND OTHER MATERIALS

Application filed December 13, 1928. Serial No. 325,920.

This invention relates to improvements concerning the manufacture of aluminum from ores containing the same, and more particularly bears upon the making of metallic aluminum by the thermal reduction of oxide ores containing the same in admixture with various impurities.

It has heretofore been proposed to prepare metallic aluminum by the reduction of the oxide ores, as for example by removing the impurity from the oxide, and then reducing the purified oxide; or by reducing the impure oxide and then eletrolytically purifying the metallic mass produced. In the first instance there was a great loss of heat energy, and purification could not be successfully accomplished except at relatively high expense; in the second instance, the quantity of electric energy required for the electrolytic separation makes the method an expensive one in the final separation.

It is now proposed to reduce such impure aluminum ores to form a metallic mass in molten condition, and to separate this mass by a fractional distillation whereby the aluminum is driven off and obtained in a pure condition. In particular, it is proposed to facilitate the distillation by the employment of reduced pressures with the concomitant advantages of reduced vapor tension of the molten aluminum.

The operation may be described as occurring in three successive steps, to wit: (1) preparation of the mass of the charge (2) reduction and purification of the charge whereby a metallic matte in molten condition is obtained, and (3) the separation of the aluminum from the matte thus produced with the efficient recovery of valuable by-products from the operation.

According to the present invention, an aluminum ore such as bauxite, i. e. impure aluminum oxide, is reduced in an induction electric furnace in the presence of carbon whereby aluminum is brought to the metallic state. In order to prevent the excessive formation of aluminum carbide, the aluminum is immediately taken up by dissolution, as it forms, into a metal bath. It is preferred for this purpose to employ a bath which in conjunction with the products resulting from the impurities in the aluminum ore shall yield valuable byproducts. A specific metal which may be employed for this purpose is iron, which may be formed either initially from iron oxide by reduction in the furnace, or by the employment of molten scrap iron in starting a furnace.

During the preliminary operation of preparing the charge, the furnace is provided with a resistive-conductive mass comprising the aluminous ore, a form of carbon, and usually with scrap iron. This charge is brought to an incandescent condition when the induction furnace is placed in operation, and the iron melts and runs down through the charge and collects as a pool in the bottom of the furnace pot. Likewise at this temperature, the carbon present in the charge reacts with the iron oxide which may be present as an impurity in the ore and produces further molten iron which passes downward in the charge mass and collects with the "starting" iron.

Furthermore, at the temperatures here employed, the carbon reacts with the silicon oxide present as an impurity in the ore, and produces free silicon and further carbon oxide. If titanium oxide is present in the ore, that is, titanium oxide, this likewise is reduced by the carbon to form free titanium metal and carbonoxide gases. It will be understood that these reductions of impurities occur before any substantial reduction of the aluminum occurs. Further it will be apparent to an expert in the art that the issuing carbonoxide gases are substantially in the form of carbon monoxide and at their high temperature will operate upon silicon oxide and iron oxide present in the upper part of a charging mass, whereby to reduce these before actually coming in contact with the pool of molten iron and other metals in the furnace pot.

The churning and agitation of the metal within the induction furnace serves to bring all parts of the charge sooner or later into contact with unconsumed carbon so that in the operation there is a thorough reduction until a balance is formed according to the quantity of carbon initially introduced.

The aluminum oxide is likewise attacked by the carbon at high temperatures to produce metallic aluminum and carbon monoxide. Within the furnace the metallic aluminum is immediately caught up by the metal pool and forms a complex molten metal matte which may be described as a ferro-silicon-aluminum alloy, in which one or another of the elements may predominate, and in which will likewise be contained other reduced metals coming from impurities in the original material such as titanium.

Care is taken during these preliminary operations of producing the alloy to maintain the temperature below the critical point of evaporation of the aluminum. For example it is preferred to accomplish the reaction at a temperature of around 1550 degrees or 1600 degrees C. for which purpose the induction furnace is excellently adapted since it is possible with such a furnace to regulate the temperature closely and accurately to a few degrees. It is likewise preferred to operate the furnace as a closed chamber under a slight reduction of pressure, to facilitate the withdrawal of the carbon monoxide gas formed and to prevent any retrograde actions tending toward re-oxidation of the aluminum formed. As a result of these steps, the furnace pot contains an alloy representing practically quantitatively the reduced metals and metalloids, iron, silicon, titanium, aluminum, etc., which were present as such or as oxides in the charging material.

This alloy mass is then subjected to an increased heat, either in the same or another furnace of the induction type and under evacuation, whereby the aluminum is caused to rapidly volatilize and pass off in the form of vapor to be collected in a suitable condensing chamber. It is preferred to heat the alloy to a temperature of around 2000 degrees C. for this separation, since at this temperature the aluminum may be taken off substantially in a pure condition, while the remaining alloy mass consists of ferro-silicon of varying composition along with any titanium that may be present. The distillation is conducted until a major portion of the aluminum has been withdrawn from the alloy: but from practical considerations such as economy of time and of current, it is usually advisable to leave a small percentage of aluminum in the ferro-silicon. No harm is done thereby, and indeed the ferro-silicon-aluminum finds a ready market: and even the titanium contained therein is of value in most instances: obviously the remaining aluminum and titanium may be slagged off from the ferro-silicon if so desired.

As raw materials may be employed various aluminous ores such as bauxite, feldspar, kaolin, etc. Owing to the value of the byproduct, ferro-silicon, obtained, it is found possible to employ even the lower grade and weaker aluminous ores to great advantage, and in many instances the reduction and melting of the metals and metalloids of the impurities would appear to facilitate the gathering and accumulation of the aluminum itself. The carbon may be present in the form of coal or charcoal, but it is preferred to employ a gas coke owing to its porosity and the conductivity of its particles, which appear to assist in the starting and operation of the furnace. It is apparent that the usual ash content of such carbon compounds gives no trouble in the course of the reactions, since any silicon, aluminum, etc., present takes part in the main reaction as though it came from the aluminous ore itself: while less easily reduced oxides, if reduced, will protect the aluminum; and if not reduced may be separated from the final ferro-silicon by a slagging operation.

If the ferro-silicon remaining after distillation of the aluminum is regarded as being too low in silicon for ready sale, its content of silicon may be successively increased by employing this metal as a "starter" for a further operation, as for example, by introducing a further charge of carbon material and aluminous ore.

As an example for the preparation of aluminum from bauxite the following figures may be given. The analysis of the bauxite when calcined is:

| | Per cent | Pounds |
|---|---|---|
| $H_2O$ | 1.5 | |
| $Al_2O_3$ | 87.5 | 46.3 of aluminum |
| $SiO_2$ | 7.0 | 3.27 of silicon |
| $TiO_2$ | 3.0 | 1.8 of titanium |
| $Fe_2O_3$ | 2.5 | 1.4 of iron |

The first charge in the furnace pot is 58.4 lbs. of iron scrap which is then heated to 1530 degrees C. to melt it. 100 lbs. of calcined bauxite mixed with 14.9 lbs. of gas coke is then added and the temperature of the furnace is brought to 1600 degrees C. The carbon then reduces the titanium, silicon, iron and aluminum to form a ferro-silicon-aluminum-titanium alloy which remains in the bottom of the pot. The carbon monoxide gas may be permitted to burn as it escapes from the furnace or may be employed usefully for calcining raw bauxite ore, or in a furnace plant, etc.

The contents of the furnace after the evolution of the carbon monoxide gas has ceased will be:—

Ferro-silicon, 13.08 pounds (9.81 pounds Fe and 3.27 pounds Si)
Titanium, 1.80 pounds
Ferro-aluminum alloy, 96.30 pounds (46.3 pounds Al and 50 pounds Fe)

The furnace is then connected to a condensing chamber, a vacuum is established, and the contents of the furnace are raised to say 2000° C., so that the aluminum will distill over.

The material in the pot is cooled down to around 1600° C., by feeding in a cold charge comprising 100 pounds of calcined bauxite, 14.9 lbs. of gas coke and 8.4 lbs. of scrap iron to replace the starting iron taken up in the ferro-silicon alloy; while the furnace is operated to maintain the 1600° temperature for the second reduction. As a result of this second reduction, further quantities of aluminum, silicon and iron are added to the pool of metal in the pot. This second production of aluminum may then be distilled away, leaving a ferro-silicon alloy as before. Since relatively more silicon has been introduced in this way than iron, there is a successive enrichment of the ferro-silicon alloy in silicon; and by proceeding in this way with successive batches, a continual enrichment of the ferro-silicon is attained.

It will particularly be noted that the major portion of the heat required to smelt the charging material is provided by the carbon, illustrated as present in the form of gas coke, and that the electric current is employed for bringing the charge to a temperature at which the reduction begins with the evolution of carbon monoxide, with possibly a small quantity for the maintenance of the charge at such temperature; and for the raising of the molten alloy to the distilling temperature. In other words, the electric current is employed very efficiently and the actual reduction to elementary form is occasioned by the substantially purely chemical reaction of the carbon present.

An especial virtue of this procedure, and its accomplishment in a closed electric furnace of the induction type, is that off-peak current may be employed for operating the furnace, since the starting is accomplished by electric currents induced in the mass of the charge, and these currents are produced and their energy absorbed within the charge itself; so that if the furnace is disconnected from the electrical network and permitted to stand without energization, the charge can be maintained at a high temperature by reason of thermal insulation around the furnace, and may be re-started even when "frozen" by merely reconnecting to the network. In this way, cheap electricity may be obtained on the basis of "off-peak" loading, thus further reducing the costs of the operation.

Another advantage of employing the closed induction furnace is that the reduction phase (production of carbon monoxide) may be accomplished initially under a slight pressure so that the carbon monoxide may be delivered in the mains for burning and recovery of its heating values, while toward the end of the reduction phase, while the carbon monoxide is being given off with difficulty only, the furnace chamber may be placed under vacuum to extract the last traces of the oxygen-containing gases. Further, the distillation of the aluminum can be accomplished in vacuum, with the result that the temperature required for a free evolution of aluminum is much reduced. Furthermore, since the carbon monoxide has been thoroughly exhausted from the mass, the aluminum is not in contact with any substance which readily yields off its oxygen or otherwise reacts with the aluminum.

Further, this employment of evacuation during the phase of distillation of the aluminum enables a strict separation to be accomplished between the aluminum and the iron and silicon, which evaporate at much higher temperatures.

The operation has been described as being accomplished in a single furnace, by a batch operation, and it is found in this way that less power is required for the succeeding charges, owing to the already-molten condition of the metal pool, and to the fact that less iron is provided in these charges than in the "starting" charge.

However, it will be understood that the phases of reduction and distillation may be accomplished in separate furnaces by discharging the reducing furnace into a distillation furnace or into a metal accumulator. Further, the furnaces for reducing and distillation may be operated in a continuous manner, resembling the operation of a blast furnace, with the constant introduction of charge material containing aluminum and silicon oxides with impurities, and a reducing agent such as a form of carbon, at the top of the system, for example; with the reduction of these oxides and the evolution of carbon monoxide during a first stage of the procedure and the collection of a pool of metal, and the withdrawal by distillation of aluminum from this metal, and the continuous or continual tapping of ferro-silicon from the portion of the metal pool from which the aluminum has just been withdrawn.

In the accompanying drawing, such an apparatus is shown to comprise the furnace structure 10 having the induction heating winding 11, and the pot 12. The winding is connected to a transformer or other suitable source 13 through a regulating device 14 by which the heating effect may be adjusted. A material feeding structure 15 has the control gates or valves 16 and 17 through which material charges may be introduced, this structure establishing a seal for the top of the furnace pot 12 except for the evacuation conduit 18 and the distilling conduit 19. A condenser 20 is cooled by the water piping 21, and is sealed to the distilling conduit 19, and is connected to a suction main 22 through a shut-off device indicated as a valve 23. This suction main 22 is also connected through a valve 24 to the evacuation conduit 18 for the furnace.

In operation, a starting charge is introduced as above described into the pot 12, and material is fed intermittently or continuously into the pot by alternate opening of the gates 16 and 17. Current is passed through the winding 11, and the valve 24 is opened, so that evolving carbon monoxide and other gases are drawn off.

From time to time, the feeding of material is interrupted, the valve 24 closed, and the valve 23 opened. The winding is then more greatly excited, so that a higher temperature develops in the furnace pot 12. The molten metallic matte in the pot is thus caused to distill, and to give off aluminum vapors, which pass through the distilling conduit 19 and are liquefied in the condenser 20. After affording a desired interval for such distillation, the valves are reversed again, and the feeding of more material through the gates 16 and 17 begun again.

After the metallic residue from the distillation has accumulated to a desired extent in the pot 12, the furnace structure may be separated from the charging structure, and the pot emptied and returned.

It is apparent that the invention is not limited to the forms of execution described by way of example, nor to the specific employment of iron as the gathering metal, nor to any particular embodiment of apparatus for carrying out the procedure; but that the invention may be employed in many ways within the scope of the appended claims.

I claim:—

1. The method of producing metallic aluminum which comprises smelting an aluminum oxide material in the presence of carbon and a metal of boiling point higher than aluminum whereby to reduce the aluminum oxide present to elemental and molten condition so that it mixes with the molten metal and with the evolution of carbon monoxide gas, while maintaining the temperature of reduction below the point of substantial volatilization of aluminum, placing the mass under vacuum to withdraw carbon monoxide gas therefrom, thereafter distilling the mixed metals whereby to evaporate the aluminum, and condensing the aluminum to the metallic state.

2. The method of producing metallic aluminum which comprises smelting an aluminum oxide in the presence of carbon and a metal having a boiling point higher than that of aluminum and molten at the temperature of smelting whereby to reduce the aluminum oxide to molten aluminum with the evolution of carbon monoxide gas, while maintaining the temperature of reduction below the point of substantial volatilization of aluminum whereby to produce an alloy containing the metal and the aluminum, exhausting the carbon monoxide gas from the mixed material by evacuation as it forms, thereafter distilling the alloy under reduced pressure whereby to evaporate the aluminum, and collecting the aluminum in the metallic state.

3. The method of producing metallic aluminum which comprises placing a mixture of impure aluminum oxide, iron, and carbon in a closed induction furnace, energizing the said furnace whereby to initiate the reduction of the oxide by the carbon, and evacuating the chamber of the furnace whereby to withdraw carbon monoxide gas therefrom while maintaining the temperature below the point of substantial volatilization of aluminum, until the carbon monoxide gas is substantially exhausted therefrom, thereafter raising the temperature of the molten mass and evacuating whereby to evaporate the aluminum, and collecting the aluminum in the metallic state.

4. In a method as set forth in claim 3, in which metal is continuously maintained in the induction furnace, to establish a closed electric circuit therein, whereby the energization may be discontinued at any time and the operation restarted without tapping or re-charging the furnace.

5. The method of producing metallic aluminum which comprises smelting an impure aluminum oxide in an electric induction furnace in the presence of carbon and a metal having a boiling point higher than aluminum so that a closed electric circuit is maintained therein whereby the energization may be discontinued at any time and the operation restarted without tapping or re-charging the furnace, while maintaining the temperature of reduction below the point of substantial volatilization of aluminum and driving off substances which volatilize below such temperature whereby to reduce substantially all the aluminum oxide and the oxides of metals and non-metals present to the metal and metalloid state, thereafter increasing the temperature and distilling the said alloy whereby to evaporate the aluminum, and collecting the aluminum in the metallic state.

6. The method of producing metallic aluminum which comprises smelting an impure aluminum oxide in the presence of carbon and a metal having a boiling point higher than aluminum while maintaining the temperature of reduction below the point of substantial volatilization of aluminum and driving off all substances which volatilize below such temperature whereby to reduce substantially all the aluminum oxide and the oxides of metals and non-metals present to the metal and metalloid state, thereafter increasing the temperature and distilling the said alloy in an electric induction furnace whereby to evaporate the aluminum, while maintaining at all times a closed electric circuit in the body of said alloy whereby the energization may be discontinued at any time and the operation re-started without tapping or re-charging the furnace, and collecting the evaporated aluminum in the metallic state.

7. The method of producing metallic aluminum which comprises smelting an impure aluminum oxide material in an electric induction furnace in the presence of carbon and metallic iron at a temperature above the melting point of metallic aluminum and iron and below the point of substantial volatilization of aluminum whereby to reduce substantially all the aluminum oxide and the oxides of the metals and non-metals which remain present, and to drive off all substances which volatilize at or below the temperature of reduction, thereafter increasing the temperature and distilling the said alloy whereby to evaporate the aluminum while maintaining at all times a closed electric circuit in said furnace whereby the energization thereof may be discontinued at any time and the operation re-started without tapping or re-charging the furnace, and collecting the evaporated aluminum in the metallic state.

8. The method of smelting an aluminum oxide material containing silica as an impurity, which comprises smelting the material in the presence of carbon and metallic iron whereby to reduce the aluminum and silicon oxides to elemental and molten condition so that they mix with the molten iron and produce an alloy therewith, while maintaining the temperature of reduction below the point of substantial volatilization of aluminum, evacuating to eliminate carbon monoxide from the alloy increasing the temperature and distilling the alloy whereby to evaporate the aluminum, re-charging with more carbon and impure aluminum oxide, reducing the impure oxide, again evacuating to eliminate carbon monoxide from the alloy and evaporating the aluminum produced, and continuing the operations of charging and evaporating until an iron and silicon alloy of predetermined high silicon content has been produced.

9. The method of producing metallic aluminum which comprises smelting an impure aluminum oxide material in the presence of carbon and a metal of boiling point higher than aluminum whereby to reduce the aluminum and other oxides present to elemental and molten condition so that they mix with the molten metal and with the evolution of carbon monoxide gas, while maintaining the temperature of reduction below the point of substantial volatilization of aluminum, employing an increasing vacuum to completely withdraw the carbon monoxide from the mixed metals, and thereafter distilling the mixed metals under vacuum whereby to evaporate the aluminum, and condensing the aluminum in the metallic state.

10. The method of producing metallic aluminum, which comprises smelting an impure aluminum oxide in an electric induction furnace in the presence of gas coke whereby to reduce the oxides of metals and metalloids present in the impure oxide and the coke inclusive of substantially all of the aluminum oxide and bring the product to molten condition with the evolution of carbon monoxide gas, while maintaining the temperature of reduction below the point of substantial volatilization of aluminum whereby to form a complex alloy containing the aluminum and the non-volatilized metals, and metalloids of the impurities of the original oxide and the coke ash, thereafter distilling the alloy whereby to evaporate the aluminum, and collecting the aluminum in the metallic state.

11. The method of producing metallic aluminum which comprises smelting an impure aluminum oxide in an electric reduction furnace in the presence of gas coke and a metal whose boiling point is higher than that of aluminum and which is molten at the temperature of smelting whereby to reduce substantially all the aluminum oxide and the oxides of other metals and metalloids present in the impure oxide and coke and bring the product to molten condition with the evolution of carbon monoxide and other volatile gases and vapors, while maintaining the temperature of reduction below the point of substantial volatilization of aluminum whereby to form a complex alloy containing the said metal and aluminum and the non-volatilized metals and metalloids of the impurities of the original oxide and of the coke ash, evacuating to effect a substantially complete elimination of carbon monoxide thereafter distilling the alloy under vacuo whereby to evaporate the aluminum, and collecting the aluminum in the metallic state.

In testimony whereof, I affix my signature.

WILLIAM JUNIUS LESTER.